United States Patent
Islam et al.

(10) Patent No.: US 12,481,309 B2
(45) Date of Patent: Nov. 25, 2025

(54) SYSTEM AND METHODS OF REDUCING WIDEBAND SERIES RESONANT CLOCK SKEW

(71) Applicant: University of Maryland Baltimore County, Baltimore, MD (US)

(72) Inventors: Riadul Islam, Windsor Mill, MD (US); Dhandeep Challagundla, Baltimore, MD (US); Ignatius Bezzam, Los Altos, CA (US)

(*) Notice: Subject to any disclaimer, the term of this patent is extended or adjusted under 35 U.S.C. 154(b) by 133 days.

(21) Appl. No.: 18/627,479

(22) Filed: Apr. 5, 2024

(65) Prior Publication Data
US 2024/0338053 A1  Oct. 10, 2024

Related U.S. Application Data

(60) Provisional application No. 63/494,380, filed on Apr. 5, 2023.

(51) Int. Cl.
*G06F 1/10* (2006.01)
*H03K 3/012* (2006.01)
*H03K 19/00* (2006.01)

(52) U.S. Cl.
CPC .............. *G06F 1/10* (2013.01); *H03K 3/012* (2013.01); *H03K 19/0019* (2013.01)

(58) Field of Classification Search
CPC ....... G06F 1/10; H03K 3/012; H03K 19/0019
See application file for complete search history.

(56) References Cited

U.S. PATENT DOCUMENTS

| | | | |
|---|---|---|---|
| 9,634,654 B2* | 4/2017 | Bucelot ............... | H03K 9/08 |
| 11,073,861 B2* | 7/2021 | Bezzam ............... | H03K 19/21 |
| 2004/0158758 A1* | 8/2004 | Zarkesh-Ha ............... | G06F 1/10 |
| | | | 713/500 |
| 2011/0084775 A1* | 4/2011 | Papaefthymiou ......... | G06F 1/10 |
| | | | 331/117 FE |

* cited by examiner

*Primary Examiner* — Sibin Chen

(57) ABSTRACT

A resonant clocking system for reducing wideband series resonant clock skew is provided. The resonant clocking system includes at least one Pulsed Series Resonance (PSR) driver, at least one clock gater, and at least one clock buffer. The PSR driver is connected with at least one on-chip inductor. The PSR driver receives a boosted-amplitude pulsed signal $V_{SR}$ that is generated using a matching pulse generator and at least one on-chip inductor connected with the at least one Pulsed Series Resonance (PSR) driver resonates with a capacitance of the resonant clocking system to generate a pulse signal $R_{CLK}$. The at least one clock gater and the at least one clock buffer propagate the pulse signal $R_{CLK}$ to clock pins of resonant flip-flops. An inductance value of the at least one on-chip inductor is matched with a load capacitance of a corresponding branch capacitance using an inductor tuning technique to obtain equal frequency signals in all clock branches, thereby storing dissipated energy in a form of a magnetic field in the at least one on-chip inductor and reducing wideband series resonant clock skew.

20 Claims, 11 Drawing Sheets

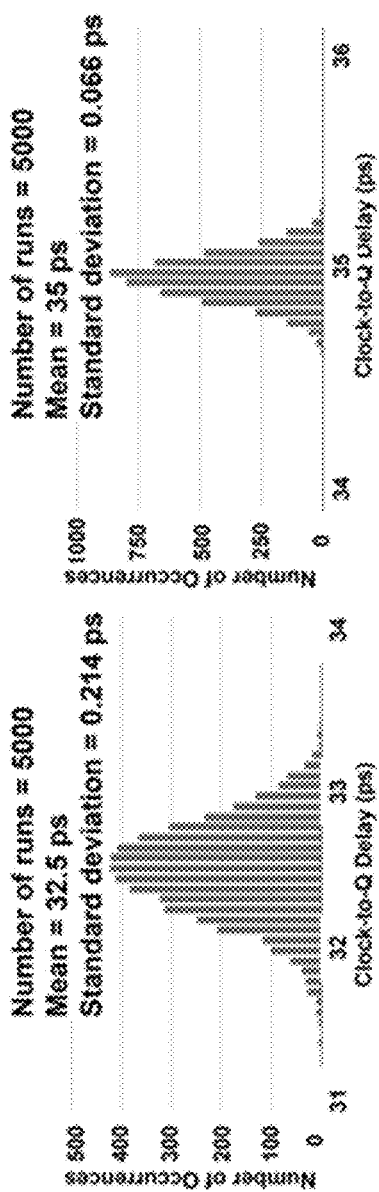
FIG. 4A
FIG. 4B
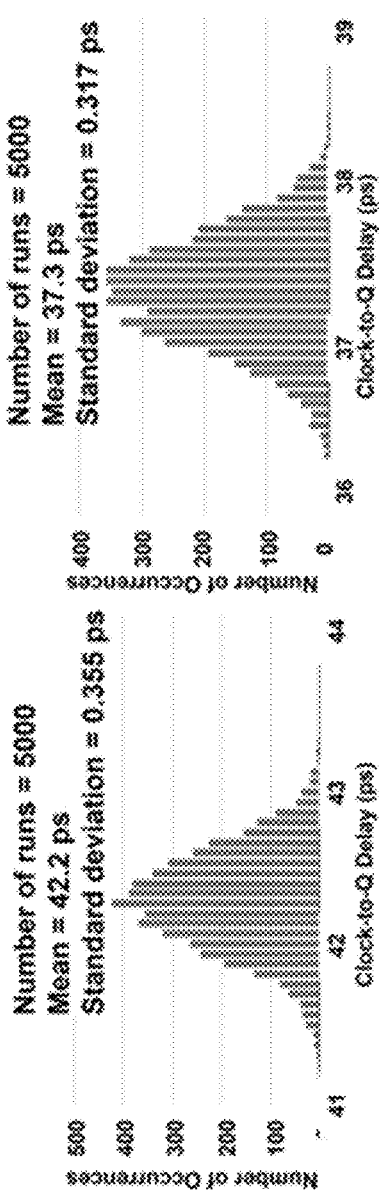
FIG. 4C
FIG. 4D

SYSTEM AND METHODS OF REDUCING WIDEBAND SERIES RESONANT CLOCK SKEW

BACKGROUND

Technical Field

The embodiments herein generally relate to reducing power consumption and skew, and more particularly, to a system and method of reducing power consumption and wideband series resonant clock skew.

Description of the Related Art

Power consumption is a significant challenge in the high-performance microprocessor industry, particularly as the demand for increased performance drives operating frequencies higher. This trend has resulted in heightened complexity among microprocessor designs. Various regions within high-performance microprocessors, including memory, logic cells, and clock networks, contribute to high power consumption. Notably, a considerable portion of dynamic power in high-frequency designs stems from switching activity within the clock network. To address this, researchers have developed numerous low-power techniques for reducing active power consumption in clock networks. Among these techniques, inductor-based LC resonant clocking methods show promise in saving switching power due to their constant phase and magnitude. However, integrating LC resonance into clock architectures is not explicitly supported by most industry-standard electronic design automation (EDA) tools. Additionally, designing resonant clock architectures requires designers to possess expertise in multiple domains due to the nonlinear behavior of inductors. Furthermore, enabling a resonant clock architecture necessitates the use of resonant flip-flops (FFs) for synchronous circuits. However, existing low-power flip-flops may not be suitable for resonant operations. Accordingly, there remains a need for a system and method of reducing power consumption and wideband series resonant clock skew.

SUMMARY

Embodiments herein provide a resonant clocking system for reducing wideband series resonant clock skew. The resonant clocking system includes at least one Pulsed Series Resonance (PSR) driver, at least one on-chip inductor, at least one clock gater, and at least one clock buffer. The at least one Pulsed Series Resonance (PSR) driver receives a boosted-amplitude pulsed signal $V_{SR}$ from a matching pulse generator. The at least one on-chip inductor connected with the at least one Pulsed Series Resonance (PSR) driver resonates with a capacitance of the resonant clocking system to generate a pulse signal $R_{CLK}$. The at least one clock gater and at least one clock buffer receive the pulse signal $R_{CLK}$ from the at least one PSR driver and propagate the pulse signal $R_{CLK}$ to clock pins of a resonant pulsed flip-flop. An inductance value of the at least one on-chip inductor is matched with a load capacitance of a corresponding branch capacitance using an inductor tuning technique to obtain equal frequency signals in all clock branches, thereby storing dissipated energy in a form of a magnetic field in the at least one on-chip inductor and reducing wideband series resonant clock skew.

In some embodiments, the resonant clocking system is a dual-rail booster that is integrated with the matching pulse generator to generate the boosted amplitude signal using a series resonance by matching a shared inductor $L_2$ with a load capacitance $C_2$.

In some embodiments, the resonant pulsed flip-flop includes a transistor M2 and a transistor M3. In some embodiments, input data is inverted and provided to the transistors M2 and M3, and the drain of the transistors M2 and M3 are connected to storage cells for storing logic "1" or logic "0".

In some embodiments, the resonant pulsed flip-flop further includes a transistor M4 and a transistor M5 controlled by a reset signal. In some embodiments, when the reset signal is low, the transistor M4 is turned on and the transistor M5 is turned off, resulting in a logic "1" at node SB and writing a logic "0" to an output Q.

In some embodiments, the resonant pulsed flip-flop further includes a clock signal $P_{clk}$. In some embodiments, when the clock signal $P_{clk}$ is "0", a transistor M1 is turned off, maintaining the resonant pulsed flip-flop in a hold or a retained state with unaltered values of nodes S and SB.

In some embodiments, when the input data is "1" and the clock signal $P_{clk}$ is "1", the transistors M2 and M1 are turned on, connecting node SB to ground, discharging the node, and resulting in a logic "1" at node Q, thereby writing a "1" into the at least one pulsed register.

In some embodiments, when the input data is "0" and the clock signal Pclk is "1", the transistors M3 and M1 are turned on, writing a logic "0" at node Q.

In some embodiments, the at least one PSR driver generates a clock pulse using the dissipated energy stored in the at least one on-chip inductor to drive clock input pins of the at least one pulsed register.

In some embodiments, the dissipated energy stored in the at least one on-chip inductor is recycled in a next-rising clock edge.

In some embodiments, the pulse signal ($R_{CLK}$) is a rail-to-rail swing signal.

In some embodiments, the output signal ($R_{CLK}$) of the at least one PSR driver is inverted using the at least one clock gater and the at least one clock buffer and employed as the clock input signal ($P_{clk}$) for the at least one pulsed register.

In some embodiments the wideband series resonant clock skew is reduced at runtime by dynamically adjusting a resonant pulse width $T_d$ to compensate for capacitance and inductance mismatch induced by at least one of an open circuit voltage (OCV) and process variations; and finely adjusting equivalent inductance with granularity using a knob, thereby reducing the wideband series resonant clock skew in runtime.

In one aspect, a resonant clock mesh system for reducing wideband series resonant clock skew is provided. The resonant clock mesh system includes at least one Pulsed Series Resonance (PSR) driver, at least one on-chip inductor, a clock mesh, at least one clock gater, and at least one clock buffer. The at least one clock gater and at least one clock buffer receive a boosted-amplitude pulsed signal $V_{SR}$ from a matching pulse generator. The at least one on-chip inductor connected with the at least one Pulsed Series Resonance (PSR) driver resonates with a capacitance of the resonant clocking system to generate a pulse signal $R_{CLK}$. The clock mesh is connected with the at least one Pulsed Series Resonance (PSR) driver. The at least one clock gater and at least one clock buffer receive the pulse signal $R_{CLK}$ from the at least one PSR driver through the clock mesh and propagate the pulse signal $R_{CLK}$ to clock pins of a resonant pulsed flip-flop. An inductance value of the at least one on-chip inductor is matched with a load capacitance of the clock mesh, thereby storing dissipated energy in a form of a magnetic field in the at least one on-chip inductor and reducing wideband series resonant clock skew.

In some embodiments, the load capacitance is determined by accumulating a local mesh capacitance ($C_{mLocal}$) and corresponding branch capacitances ($C_{lLocal}$).

In some embodiments, the resonant pulsed flip-flop includes a transistor M2 and a transistor M3. In some embodiments, input data is inverted and provided to the transistors M2 and M3, and the drain of the transistors M2 and M3 are connected to storage cells for storing logic "1" or logic "0".

In some embodiments, the resonant pulsed flip-flop further includes a transistor M4 and a transistor M5 that are controlled by a reset signal. In some embodiments, when the reset signal is low, the transistor M4 is turned on and the transistor M5 is turned off, resulting in a logic "1" at node SB and writing a logic "0" to an output Q.

In some embodiments, the resonant pulsed flip-flop further includes a clock signal $P_{clk}$. In some embodiments, when the clock signal $P_{clk}$ is "0", a transistor M1 is turned off, maintaining the resonant pulsed flip-flop in a hold or a retained state with unaltered values of nodes S and SB.

In some embodiments, when the input data is "1" and the clock signal $P_{clk}$ is "1", the transistors M2 and M1 are turned on, connecting node SB to ground, discharging the node, and resulting in a logic "1" at node Q, thereby writing a "1" into the at least one pulsed register.

In some embodiments, when the input data is "0" and the clock signal Pclk is "1", the transistors M3 and M1 are turned on, writing a logic "0" at node Q.

In another aspect, a method for reducing wideband series resonant clock skew is provided. The method includes receiving, using at least one Pulsed Series Resonance (PSR) driver, a boosted amplitude pulsed signal $V_{SR}$ from a matching pulse generator. The method includes generating a pulse signal $R_{CLK}$ using at least one on-chip inductor connected with the at least one Pulsed Series Resonance (PSR) driver that resonates with a capacitance of a resonant clocking system. The method includes receiving, using at least one clock gater and at least one clock buffer, the pulse signal $R_{CLK}$ from the at least one PSR driver and propagating the pulse signal $R_{CLK}$ to clock pins of a resonant flip-flop. The method includes matching an inductance value of the at least one on-chip inductor with a load capacitance of a corresponding branch capacitance using an inductor tuning technique to obtain equal frequency signals in all clock branches, thereby storing dissipated energy in a form of a magnetic field in the at least one on-chip inductor and reducing wideband series resonant clock skew.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIGS. 4A-4D are exemplary graphs that illustrate Monte Carlo simulation results for one or more registers by considering 5000 samples with 10% length variation according to some embodiments herein;

DETAILED DESCRIPTION OF PREFERRED EMBODIMENTS

Figure 1:
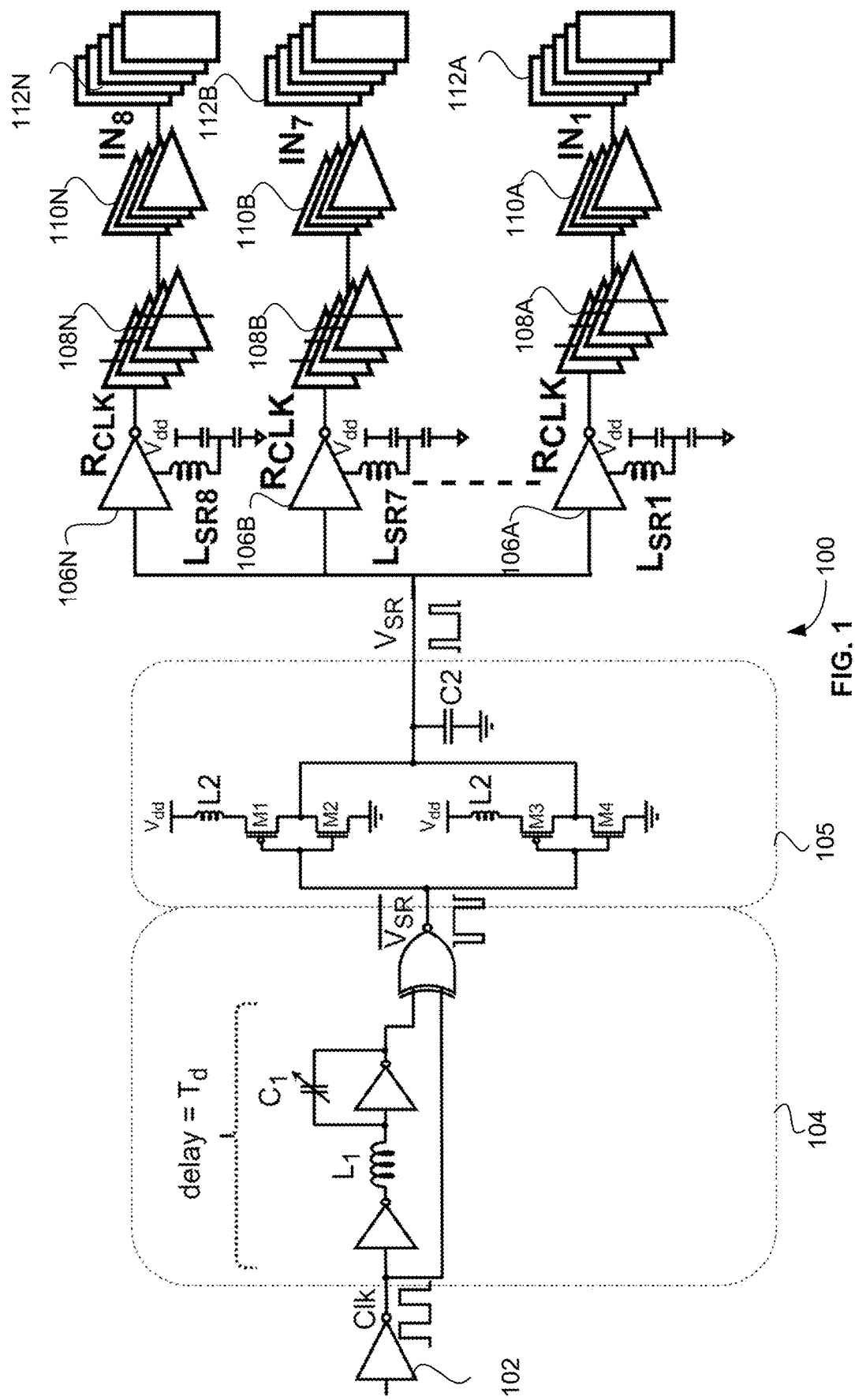
FIG. 1 illustrates a circuit of a resonant clocking system for reducing wideband series resonant clock skew according to some embodiments herein.

The embodiments herein and the various features and advantageous details thereof are explained more fully with reference to the non-limiting embodiments that are illustrated in the accompanying drawings and detailed in the following description. Descriptions of well-known components and processing techniques are omitted to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for a resonant clocking system for reducing wideband series resonant clock skew. Referring now to the drawings, and more particularly to FIG. 1 through FIG. 11, where similar reference characters denote corresponding features consistently throughout the figures, there are shown preferred embodiments.

Definitions

Skew: Skew is defined as the temporal variation in the arrival time of clock transition at two different locations.

FIG. 1 illustrates a circuit of a resonant clocking system 100 for reducing wideband series resonant clock skew according to some embodiments herein. The resonant clocking system 100 includes a clock source 102, a matching pulse generator 104, one or more Pulsed Series Resonance (PSR) drivers connected 106A-N with one or more on-chip inductors ($L_{SR1}$, $L_{SR7}$, to $L_{SR8}$), one or more clock garters 108A-N, one or more clock buffers 110A-N and one or more pulsed registers 112A-N. The matching pulse generator 104 converts a 50% duty cycle clock that is generated by the clock source 102 into a boosted amplitude pulsed signal $V_{SR}$. The one or more PSR drivers 106A-N connected with one or more on-chip inductors ($L_{SR1}$, $L_{SR7}$, to $L_{SR8}$) receive a boosted-amplitude pulsed signal $V_{SR}$ that is generated using the matching pulse generator 104. The one or more on-chip inductors ($L_{SR1}$, $L_{SR7}$, to $L_{SR8}$) resonate with a capacitance of the resonant clocking system 100 to generate a pulse signal $R_{CLK}$. In some embodiments, a series inductor $L_1$ and a matching miller capacitor $C_1$ generate a delay of $$Td = \pi\sqrt{L1C1}.$$

In some embodiments, a clock and a delayed signal are fed into an XNOR gate to generate the pulsed signal $V_{SR}$ at both clock edges with a pulse width $T_d$. In some embodiments, a voltage doubler circuit is employed to invert a generated dual-edge triggered pulse resulting in the boosted signal $V_{SR}$. The voltage doubler circuit may use a pulsed series resonance technique to generate the boosted amplitude pulsed signal $V_{SR}$. When the $V_{SR}$ is low, PMOS transistors M1 and M3 are "ON," and the inductor resonates with the load capacitance $C_2$, which represents the total capacitance load of the one or more PSR drivers 106A-N. In some embodiments, the value of the series inductors is small for large load capacitances. The inductor in the voltage doubler circuit may be adjusted based on a load of the matching pulse generator 104 to generate boosted amplitude pulsed signal $V_{SR}$. In some embodiments, the resonant clocking system 100 includes a dual-rail booster circuit 105 to reduce the power consumed by the voltage doubler by decreasing the resistance of a pull-up network.

The one or more clock garters 108A-N and the one or more clock buffers 110A-N receive the pulse signal $R_{CLK}$ from the one or more PSR drivers 106A-N connected with the one or more on-chip inductors ($L_{SR1}$, $L_{SR7}$, to $L_{SR8}$) and propagate the pulse signal $R_{CLK}$ to clock pins of resonant flip-flops. An inductance value of the one or more on-chip inductors ($L_{SR1}$, $L_{SR7}$, to $L_{SR8}$) is matched with a total capacitance of a corresponding branch capacitance ($C_{SR1}$, ($C_{SR7}$, to $C_{SR8}$) using an inductor tuning technique to obtain equal frequency signals in all clock branches, thereby storing dissipated energy in a form of a magnetic field in the one or more on-chip inductors ($L_{SR1}$, $L_{SR7}$, to $L_{SR8}$) and reducing wideband series resonant clock skew.

In some embodiments, the inductance for each PSR driver is determined using $$F_{res} = \frac{1}{2 \times DC_{rez}} = \frac{1}{2\pi\sqrt{L \times (C_{load})}}$$

$$L = \frac{DC_{rez}^2}{\pi^2 \times (C_{load})}$$

where $DC_{rez}$ is defined by pulse width $T_d$ generated by the matching pulse generator 104 and $C_{load}$ is the load capacitance of an inductor L. The on-chip inductors $L_{SR1}$ to $L_{SR8}$ are matched with the load capacitances $C_{SR1}$ to $C_{SR8}$, respectively, to have equal frequencies. This inductor matching would result in equal frequency signals in all the clock branches, thus, reducing the skew. In some embodiments, the wideband frequency of operation will not be affected, as the resonant frequency is independent of an input clock frequency. In some embodiments, the delay=Td of the matching pulse generator 104 occurs due to independent of the input clock pulse width, and it works on the clock edges. Thus, for all the clock frequencies less than the derived resonant frequency $f_{RES}$, the same inductor value is obtained which results in reduced skew. In some embodiments, the wideband series resonant clock skew is reduced at runtime by dynamically adjusting a resonant pulse width $T_d$ to compensate for capacitance and inductance mismatch induced by at least one of an open circuit voltage (OCV) and process variations; and using a knob to finely adjust equivalent inductance with granularity, thereby reducing the wideband series resonant clock skew in runtime. In some embodiments, power-up calibration of this pulse width $T_d$ can be performed using a programmable register.

Figure 2:
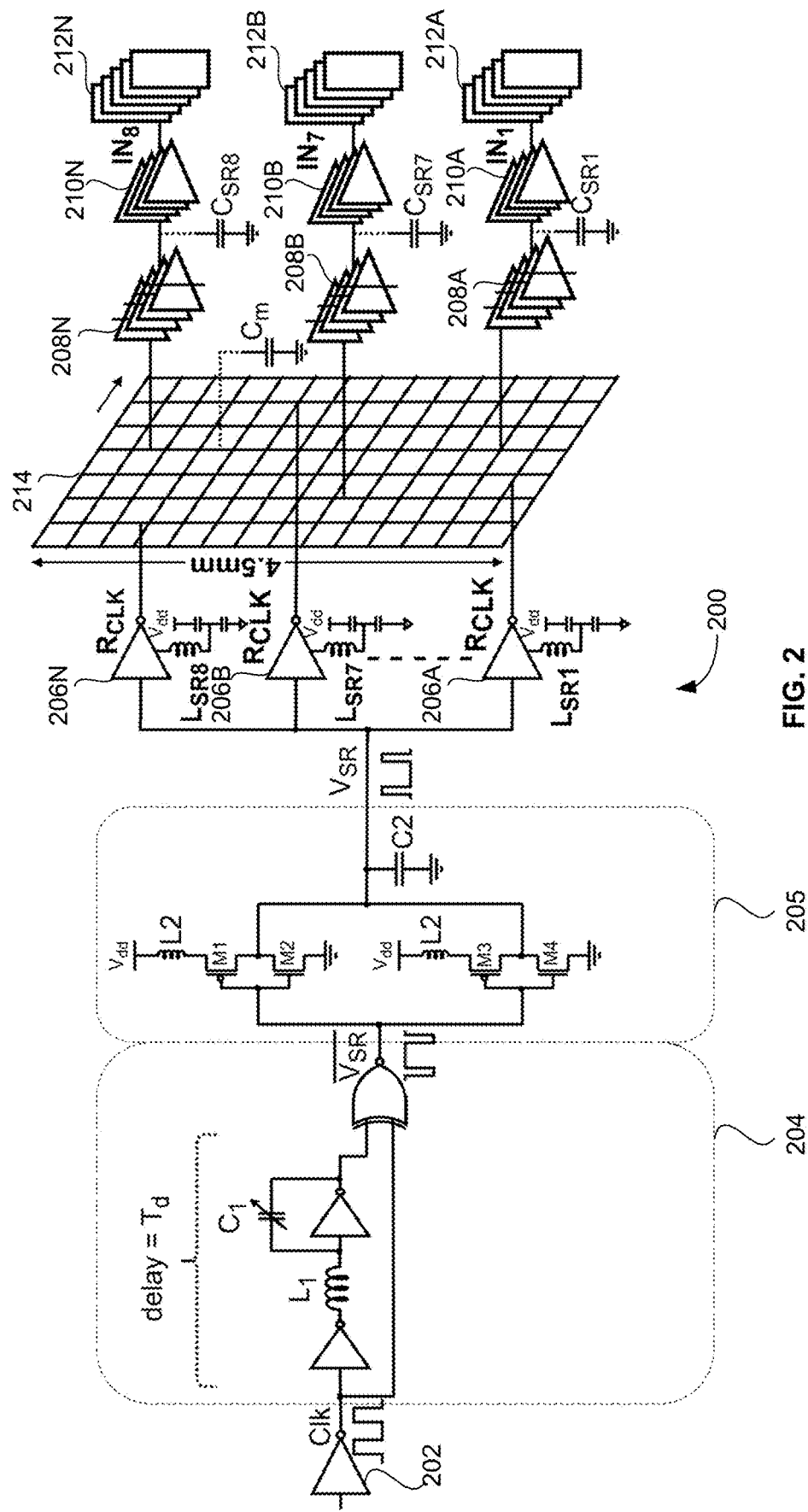
FIG. 2 illustrates a circuit of a resonant clock mesh system for reducing wideband series resonant clock skew according to some embodiments herein.

FIG. 2 illustrates a circuit of a resonant clock mesh system 200 for reducing wideband series resonant clock skew according to some embodiments herein. The resonant clock mesh system 200 includes a clock source 202, a matching pulse generator 204, one or more Pulsed Series Resonance (PSR) drivers connected 206A-N with one or more on-chip inductors ($L_{SR1}$, $L_{SR7}$, to $L_{SR8}$), one or more clock garters 208A-N, one or more clock buffers 210A-N, one or more pulsed registers 212A-N and a clock mesh 214. The resonant clock mesh system 200 includes the clock mesh 202 at the end of the one or more PSR drivers 206A-N. Similar to the resonant clocking system 100, the one or more PSR drivers 206A-N receive a boosted input signal $V_{SR}$. In the case of the clock mesh 214, the capacitance of the mesh ($C_m$) and the branch capacitances ($C_{SR1}$, $C_{SR7}$, . . . , $C_{SR8}$) form the load capacitance ($C_{load}$), which is in series with the one or more on-chip inductors ($L_{SR1}$, $L_{SR7}$, to $L_{SR8}$). In some embodiments, an inductance value of the one or more on-chip inductors ($L_{SR1}$, $L_{SR7}$, to $L_{SR8}$) on the one or more PSR drivers 206A-N is not matched with a local branch capacitance in the resonant clock mesh system 200. Instead, an absolute capacitance of the clock mesh 214 is matched with the inductance value of the one or more on-chip inductors ($L_{SR1}$, $L_{SR7}$, to $L_{SR8}$) to recycle the power and minimize the skew generated by the clock mesh 214. In some embodiments, this inductance is then distributed at various points on the inductance value of the clock mesh 214 for the clock to be easily accessible at all the mesh nodes. Since the clock mesh 214 consumes large amounts of metal, it has high switching capacitance resulting in increased power consumption. However, this high capacitance results in a low total inductor value. In some embodiments, the resonant clock mesh system 200 includes a dual-rail booster circuit 205 to reduce the power consumed by the voltage doubler by decreasing the resistance of a pull-up network.

Figure 3:
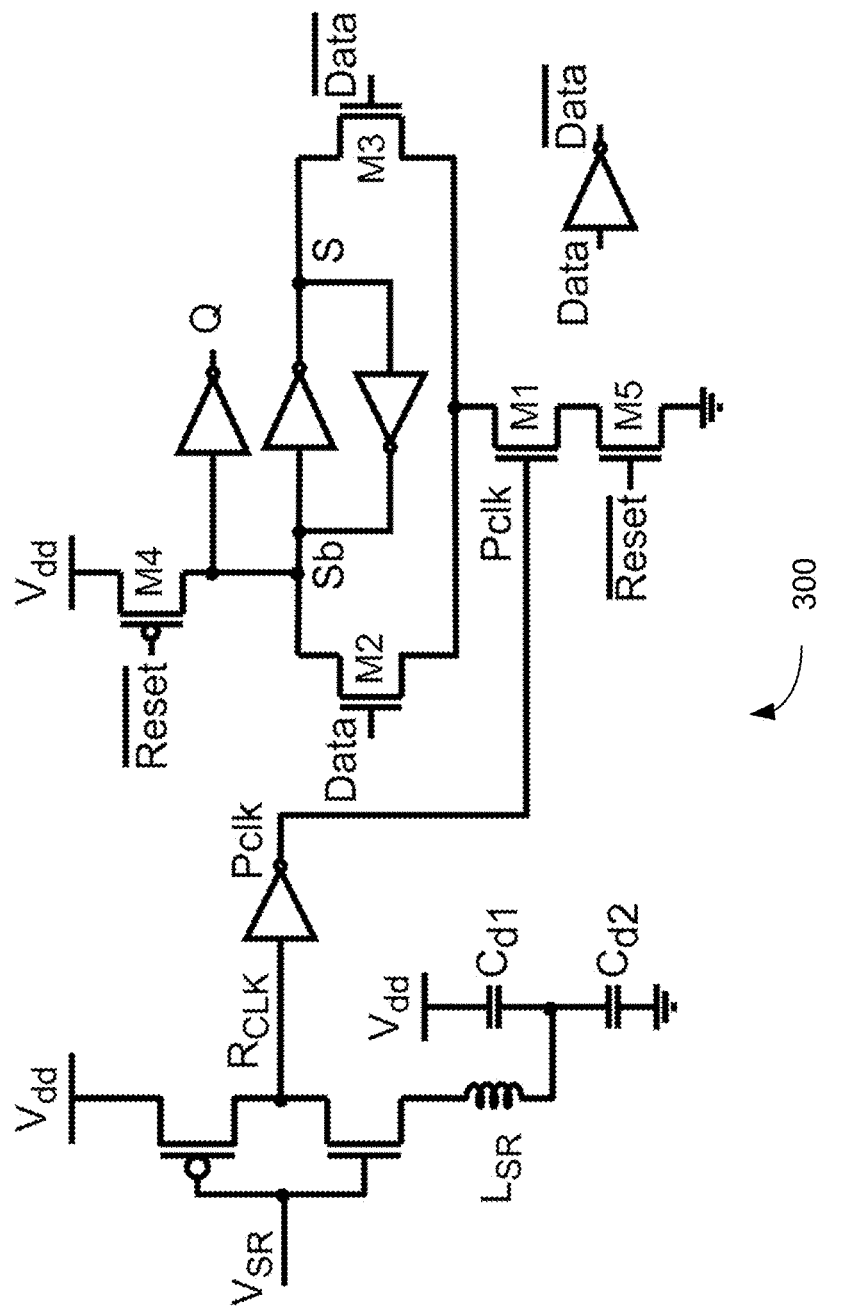
FIG. 3 is a circuit that illustrates a Resonant Pulsed Flip-Flop according to some embodiments herein.

FIG. 3 is a circuit that illustrates a pulsed flip-flop 300 according to some embodiments herein. FIG. 3 depicts a transistor-level implementation of the Resonant pulsed flip-flop. In some embodiments, the Resonant Pulsed Flip-Flop 300 is at least one of, but not limited to, a Primary-Secondary Flip-Flop (PSFF), a Pulsed Resonant Flip-Flop (PRFF), a 13T Pulsed Flip-flop (13TPFF), or a Resonant true single-phase clock (TSPC) Flip-Flop. The Resonant Pulsed Flip-Flop 300 includes a transistor M1, a transistor M2, a transistor M3, a transistor M4, and a transistor M5. In some embodiments, input data is inverted and provided to the transistors M2 and M3, and the drain of transistors M2 and M3 are connected to storage cells for storing logic "1" or logic "0". The transistor M4 and the transistor M5 are controlled by a reset signal. In some embodiments, when the reset signal is low, the transistor M4 is turned on and the transistor M5 is turned off, resulting in a logic "1" at node SB and writing a logic "0" to an output Q. In some embodiments, the resonant flip-flop further includes a clock signal $P_{clk}$. In some embodiments, when the clock signal $P_{clk}$ is "0", transistor M1 is turned off, maintaining the resonant flip-flop in a hold or a retained state with unaltered values of nodes S and SB. In some embodiments, when the input data is "1" and the clock signal $P_{clk}$ is "1", the transistors M2 and M1 are turned on, connecting node SB to ground, discharging the node, and resulting in a logic "1" at node Q, thereby writing a "1" into the register. In some embodiments, when the input data is "0" and the clock signal $P_{clk}$ is "1", the transistors M3 and M1 are turned on, writing a logic "0" at node Q.

FIGS. 4A-4D are exemplary graphs that illustrate Monte Carlo simulation results for one or more flip-flops by considering 5000 samples with 10% length variation according to some embodiments herein. The one or more flip-flops may be a Primary-Secondary Flip-Flop (PSFF), a Pulsed Resonant Flip-Flop (PRFF), a 13T Pulsed Flip-flop (13TPFF), or a Resonant true single-phase clock (TSPC) Flip-Flop. In FIG. 4A, a PS flip-flop has a mean of 32.5 ps with an SD of 0.214 ps. In FIG. 4B, PRFF has a mean of 35 ps with an SD of 0.066 ps. In FIG. 4C, TSPCFF has a mean of 42.2 ps with an SD of 0.355 ps. In FIG. 4D, a 13TPFF has a mean of 32.3 ps with SD of 0.317 ps.

Figure 5:
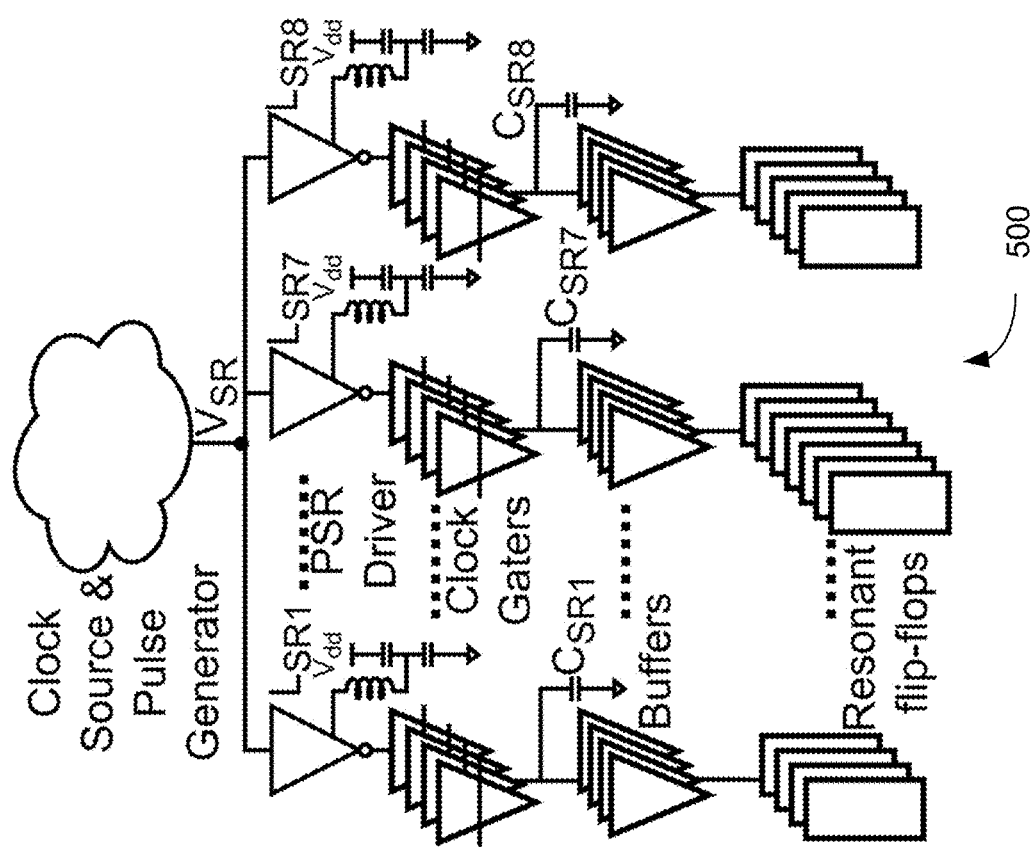
FIG. 5 is an exemplary diagram that illustrates a circuit of the resonant clocking system for functional simulation implemented using standard 7-nm and 14-nm FinFET technology according to some embodiments herein.

FIG. 5 is an exemplary diagram 500 that illustrates a circuit of the resonant clocking system 100 for functional simulation implemented using standard 7-nm and 14-nm FinFET technology according to some embodiments herein. In some embodiments, the resonant clocking system 100, while using 13TPFFs, saves 21.9% power in 14 nm technology, and 26.5% power while using 7 nm technology, compared to a conventional clock tree architecture with PSFFs. The skew generated by a traditional clock tree may be 51.1 ps and 32.4 ps, using 14 nm and 7 nm, respectively. As a result of an inductor tuning technique, the resonant clocking system 100 reduces the skew generated by 92% and 87% in 14 nm and 7 nm technologies, respectively, while using 13TPFFs. Similarly, the resonant clocking system 100 reduces 27% power and 95% skew in 14 nm technology while using TSPCFFs, and 29% power and 88% skew in 7 nm technology. The resonant clocking system 100 saves the highest power when using PRFFs. It saves 43% power while reducing the skew by 90% in 14 nm technology and saves 45.8% power and 87% skew using 7 nm technology.

Table: 1 shows a 13TPFF exhibits a better setup and hold times than the industry-standard PSFF while consuming more dynamic power and area; however, it consumes lower static power than PSFF and enables power saving in overall clock architecture.

| Type of Register | Normalized area | Delay (ps) | | | Static power (pW) | | Dynamic Power (μW) | | | | |
|---|---|---|---|---|---|---|---|---|---|---|---|
| | | tc-q | ts | th | D = 0 | D = 1 | 1 GHz | 2 GHz | 3 GHz | 4 GHz | 5 GHz |
| MSFF | 1 | 32.5 | 14 | 2 | 1550 | 593 | 8.3 | 14.1 | 21 | 28 | 35.1 |
| PRFF | 0.59 | 35.195 | — | 96 | 278 | 272 | 7.16 | 13.8 | 20.4 | 27.1 | 33.8 |
| TSPCFF | 0.84 | 41.992 | — | 93 | 283 | 664 | 12.3 | 20.2 | 28 | 35.9 | 43.7 |
| 13TPFF | 1.75 | 37.325 | — | 60 | 501 | 538 | 16.2 | 31.1 | 46 | 61 | 76 |

Table: 2 shows resonant clock tree system using 14 nm and 7 nm technology nodes

| Type of network | Technology node | Skew (ps) | Power consumed (mW) | | | | |
|---|---|---|---|---|---|---|---|
| | | | 1 GHz | 2 GHz | 3 GHz | 4 GHz | 5 GHz |
| PSFF network | 14 nm | 51.1 | 30.8 | 60.6 | 89.2 | 116 | 138 |
| | 7 nm | 32.4 | 59.8 | 119 | 172 | 234 | 296 |
| PRFF network | 14 nm | 4.61 | 17.4 | 34.1 | 50.3 | 65.7 | 78.7 |
| | 7 nm | 3.95 | 32.5 | 64.9 | 92.4 | 127 | 160 |
| TSPCFF network | 14 nm | 2.05 | 22.2 | 43.6 | 64.6 | 84.4 | 102 |
| | 7 nm | 3.66 | 42.1 | 84.3 | 123 | 167 | 209 |
| 13TPFF network | 14 nm | 3.92 | 23.8 | 46.8 | 69.4 | 90.7 | 110 |
| | 7 nm | 4.14 | 43.9 | 87.2 | 126 | 173 | 218 |

Power and skew comparisons of the clock tree system for frequencies ranging from 1 to 5 GHz are shown in above Table 2. The power and skew values of flip-flop networks by scaling frequency from 1 to 5 GHz depict consistent power savings and skew reduction while using a resonance technique.

Figure 6:
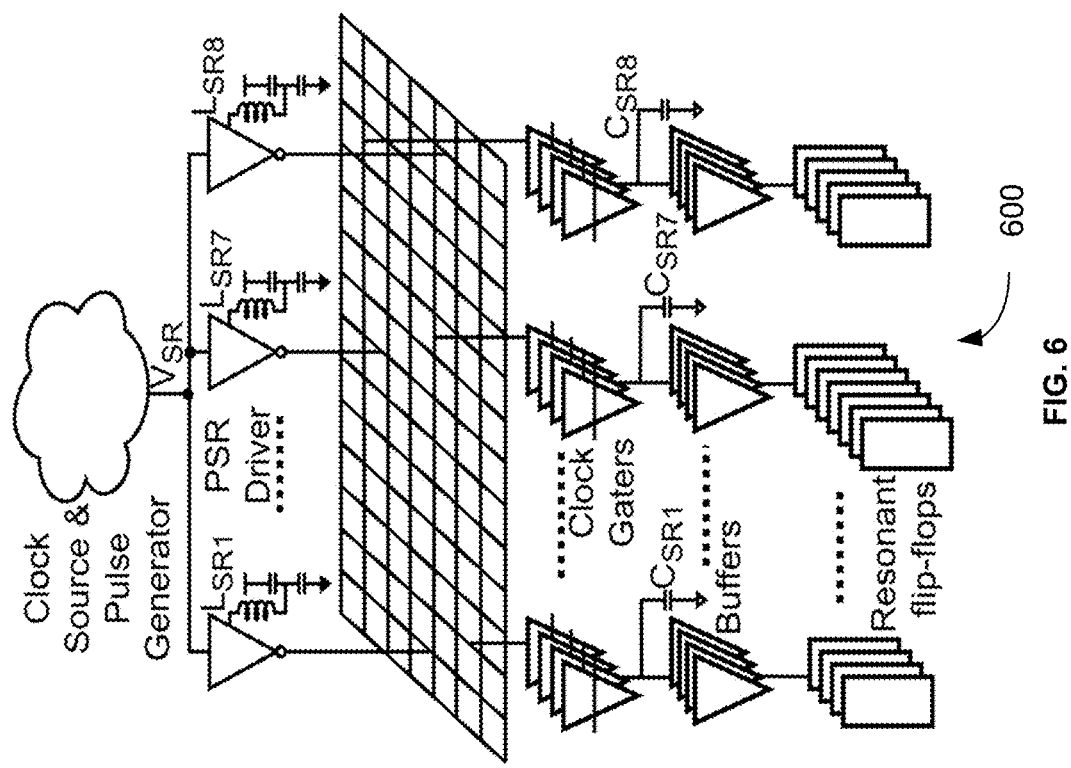
FIG. 6 is an exemplary diagram that illustrates a circuit of the resonant clock mesh system for functional simulation implemented using standard 7-nm and 14-nm FinFET technology according to some embodiments herein.

FIG. 6 is an exemplary diagram 300 that illustrates a circuit of the resonant clock mesh system 200 for functional simulation implemented using standard 7-nm and 14-nm FinFET technology according to some embodiments herein. The resonant clock mesh system 200 with 81 PRFFs reduces the power consumption by 66% with a skew reduction of 85% while using the ISPD 2009 testbench, extracted from IBM ASIC design with 81 flip-flops.

Moreover, the resonant clock mesh system 200 using TSPCFF saves 64% power while lowering the skew by 92%, and the resonant clock network using 13TPFF saves 59% power with 88% skew reduction.

The resonant clock mesh system 200 using PRFF also has 65% reduced power consumption with 83% reduced skew if the ISPD 2010 testbench circuit has more sink density with 1107 sinks. Also, the resonant clock mesh system 200 with TSPCFF saves 61% power and 91% skew, and the resonant clock mesh system 200 using 13TPFF reduces 57% power consumption with 89.5% skew reduction. The resonant clock mesh system 200 using PRFF saves 63% of the power while reducing the skew by 87% if the ISCAS89 testbench circuit has 179 clock sinks and 2779 logic gates. Moreover, the resonant clock mesh system 200 using TSPCFF has 61.7% reduced power consumption with 90% reduced skew, and the resonant clock network using 13TPFF has 57.6% reduced power consumption with 85% reduced skew. Table: 3 shows an analysis of the resonant clock mesh system 200 using 14 nm and 7 nm technology nodes.

| Type of network | Technology Node | Skew (ps) | Power consumed (mW) | | | | |
|---|---|---|---|---|---|---|---|
| | | | 1 GHz | 2 GHz | 3 GHz | 4 GHz | 5 GHz |
| PSFF network | 14 nm | 108 | 35.3 | 68.5 | 102 | 131 | 162 |
| | 7 nm | 74 | 74.4 | 151 | 221 | 294 | 368 |
| PRFF network | 14 nm | 10.3 | 19.2 | 38.1 | 56.5 | 74.2 | 88.7 |
| | 7 nm | 8.4 | 40.2 | 82.7 | 121 | 163 | 202 |
| TSPCFF network | 14 nm | 9.74 | 23.5 | 46.7 | 69.3 | 91.1 | 110 |
| | 7 nm | 7.94 | 49.8 | 102 | 149 | 195 | 242 |
| 13TPFF network | 14 nm | 9.16 | 25.2 | 50.1 | 74.4 | 97.9 | 118 |
| | 7 nm | 8.12 | 54 | 110 | 164 | 215 | 267 |

The results obtained by scaling the frequency from 1 to 5 GHz support the resonant clock tree analysis showing similar power saving and reduction in skew even on a lower technology node.

Table: 4 shows the power and skew analysis of the resonant clocking system 100 resulting in consistent power savings and balanced skew on the ISPD 2009 s1r1, ISPD 2010 01. in, and ISCAS89 s5738 circuits; the PRFF network saves 64% power on average with 85% reduced skew at 1 GHz frequency.

clock power consumption and PRFF has 70% lower clock power consumption compared to a conventional clock architecture using PSFF. The energy consumption of the resonant clocking system 100 across 1-5 GHz frequency is shown in Table 5.

While using the ISPD 2009 testbench circuit (s1r1 with 81 sinks), the resonant clocking system 100 using PRFF reduces the energy consumption by 66.2% on average compared to conventional clock architecture using PSFF across 1-5 GHz frequency, while the resonant clocking system 100 using 13TPFF saves 59.9% energy on average. While using the ISPD 2010 testbench circuit (01. in with 1107 sinks), the resonant clocking system 100 using TSPCFF saves 63.7% energy on average across 1-5 GHz frequency, while the resonant clocking system 100 using PRFF saves 66.4% energy compared to conventional clock architectures using PSFF. The resonant clocking system 100 using PRFF saves 65.4% average energy consumption on the ISCAS89 testbench circuit (s5378 with 179 sinks) while saving 59.7% average energy while using 13TPFF across 1-5 GHz clock frequency. The heat generated throughout the circuit can be estimated through the junction temperature

| Benchmark | Type of network | Frequency (GHz) | | | | | | | | | |
|---|---|---|---|---|---|---|---|---|---|---|---|
| | | 1 GHz | | 2 GHz | | 3 GHz | | 4 GHz | | 5 GHz | |
| | | Skew (ps) | Power (mW) | Skew (ps) | Power (mW) | Skew (ps) | Power (mW) | Skew (ps) | Power (mW) | Skew (ps) | Power (mW) |
| ISPD 2009 s1r1 | PSFF network | 29 | 6.65 | 33 | 12.7 | 31 | 18.62 | 37 | 25.4 | 34 | 30.25 |
| | PRFF network | 4.4 | 2.15 | 2.7 | 4.3 | 3.6 | 6.44 | 3.9 | 8.58 | 3.3 | 10.3 |
| | TSPCFF network | 2.28 | 2.32 | 2.4 | 4.55 | 2.3 | 6.79 | 2.9 | 9.02 | 2.4 | 10.8 |
| | 13TPFF network | 3.72 | 2.57 | 4.3 | 5.14 | 4.2 | 7.6 | 3.8 | 10.1 | 4.1 | 12.2 |
| ISPD 2010 01. in | PSFF network | 22.7 | 53.3 | 26.7 | 107 | 33.4 | 160 | 31.3 | 213 | 42.6 | 269 |
| | PRFF network | 4.25 | 18.4 | 6.37 | 35.7 | 6.65 | 54.3 | 5.2 | 70.9 | 5.73 | 88 |
| | TSPCFF network | 2.1 | 20.3 | 3.32 | 39.2 | 2.92 | 59 | 4.22 | 75 | 3.7 | 92 |
| | 13TPFF network | 12.4 | 23.4 | 3.4 | 44.7 | 3.1 | 67.4 | 3.5 | 89.2 | 4.1 | 105 |
| ISCAS89 s5378 | PSFF network | 24.9 | 14.1 | 25.8 | 28.1 | 24.9 | 42.1 | 23.4 | 56.1 | 21.4 | 70.1 |
| | PRFF network | 3.11 | 5.09 | 3.72 | 9.94 | 3.16 | 14.4 | 3.94 | 19.2 | 3.31 | 22.9 |
| | TSPCFF network | 2.42 | 5.4 | 2.75 | 10.6 | 2.51 | 15.9 | 2.77 | 21.5 | 3.1 | 24.4 |
| | 13TPFF network | 3.7 | 5.97 | 4.22 | 11.4 | 3.73 | 17.1 | 4.3 | 22.6 | 4.74 | 26.3 |

Figure 7:
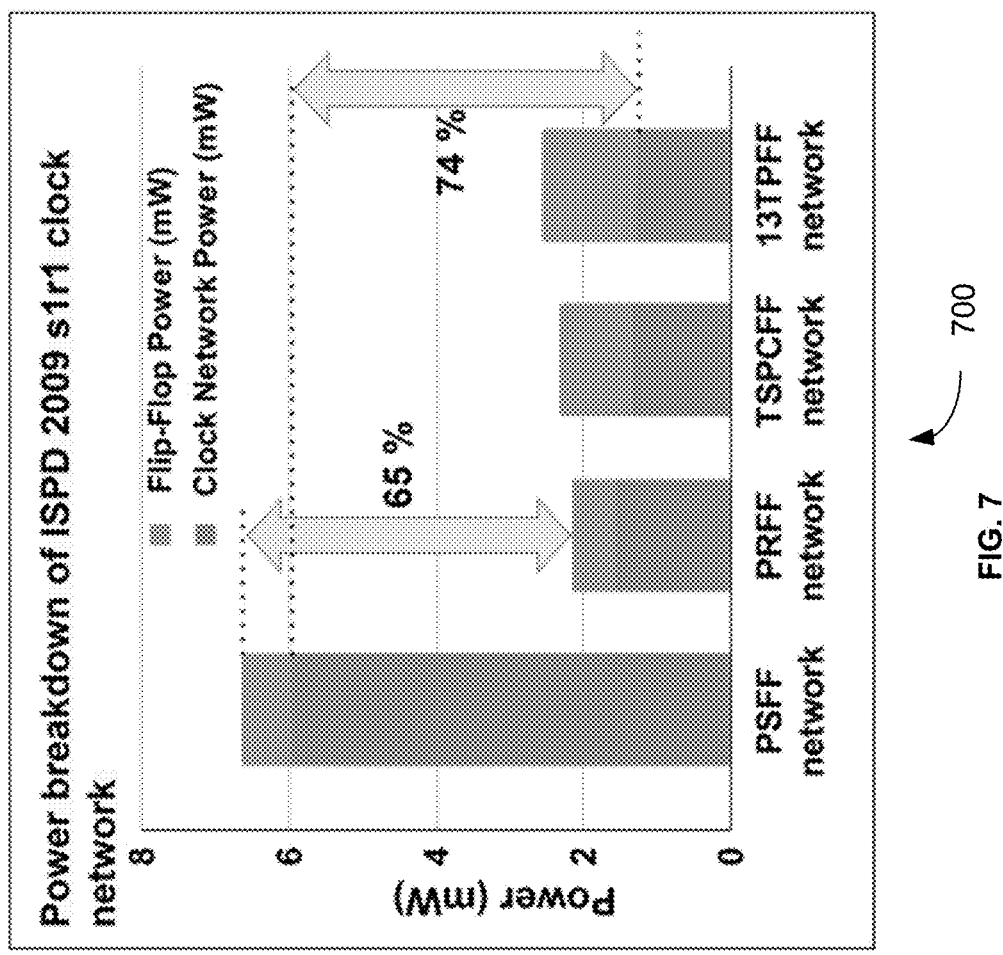
FIG. 7 is an exemplary graph that illustrates total power consumption in a resonant clocking system using a 13TPFF according to some embodiments herein.

FIG. 7 is an exemplary graph 700 that illustrates total power consumption in the resonant clocking system 100 using a 13TPFF according to some embodiments herein. The resonant clocking system 100 with 13TPFF consumes 74% less power in the clock network compared to conventional clock architecture with PSFF, while consuming 48% higher flip-flop power resulting in 57% reduced total power consumption. In addition, the clock network power in the resonant clocking system 100 with TSPCFF has 72% lower (Tj) using the transient thermal resistance (θJ A) for a pulse length tp, which can be represented as:

$$T_j = T_A + P \times \theta_{JA}(t_p)$$

where P is the power consumed during tp, and TA is the ambient temperature [10].

Table: 5 shows the resonant clocking system 100 has 67.2% lower energy and 7.2° C. lower junction temperature while using PRFF for ISPD 2010 01. in the circuit compared to conventional clock architectures at 5 GHz frequency; besides the 13TPFF has a 59.3% lower average energy consumption compared to conventional clock architectures using PSFF.

take any active silicon area. In some embodiments, the inductors can also be placed in dark silicon regions to achieve a higher quality factor.

Table: 6 shows a comparison of the PRFF network with previous low-power clocking techniques depicting an average skew reduction of 78% in the ISPD 2009 s1r1 benchmark and 80.8% while using ISPD 2010 01. in benchmarks.

| Benchmark | Type of network | 1 GHz Energy (pJ) | Temp. (° C.) | 2 GHz Energy (pJ) | Temp. (° C.) | 3 GHz Energy (pJ) | Temp. (° C.) | 4 GHz Energy (pJ) | Temp. (° C.) | 5 GHz Energy (pJ) | Temp. (° C.) |
|---|---|---|---|---|---|---|---|---|---|---|---|
| ISPD 2009 s1r1 | PSFF network | 6.65 | 27.266 | 6.35 | 27.508 | 6.21 | 27.7448 | 6.35 | 28.016 | 6.05 | 28.21 |
| | PRFF network | 2.15 | 27.086 | 2.15 | 27.172 | 2.15 | 27.2576 | 2.15 | 27.3432 | 2.06 | 27.412 |
| | TSPCFF network | 2.32 | 27.0928 | 2.28 | 27.182 | 2.26 | 27.2716 | 2.26 | 27.3608 | 2.16 | 27.432 |
| | 13TPFF network | 2.57 | 27.1028 | 2.57 | 27.2056 | 2.53 | 27.304 | 2.53 | 27.404 | 2.44 | 27.488 |
| ISPD 2010 01. in | PSFF network | 53.30 | 29.132 | 53.50 | 31.28 | 53.33 | 33.4 | 53.25 | 35.52 | 53.80 | 37.76 |
| | PRFF network | 18.40 | 27.736 | 17.85 | 28.428 | 18.10 | 29.172 | 17.73 | 29.836 | 17.60 | 30.52 |
| | TSPCFF network | 20.30 | 27.812 | 19.60 | 28.568 | 19.67 | 29.36 | 18.75 | 30 | 18.40 | 30.68 |
| | 13TPFF network | 23.40 | 27.936 | 22.35 | 28.788 | 22.47 | 29.696 | 22.30 | 30.568 | 21.00 | 31.2 |
| ISCAS89 s5378 | PSFF network | 14.10 | 27.564 | 14.05 | 28.124 | 14.03 | 28.684 | 14.03 | 29.244 | 14.02 | 29.804 |
| | PRFF network | 5.09 | 27.2036 | 4.97 | 27.3976 | 4.80 | 27.576 | 4.80 | 27.768 | 4.58 | 27.916 |
| | TSPCFF network | 5.40 | 27.216 | 5.30 | 27.424 | 5.30 | 27.636 | 5.38 | 27.86 | 4.88 | 27.976 |
| | 13TPFF network | 5.97 | 27.2388 | 5.70 | 27.456 | 5.70 | 27.684 | 5.65 | 27.904 | 5.26 | 28.052 |

Table 5 compares the junction temperatures of the resonant clocking system 100 with the conventional clock architecture using PSFF at 5 GHz frequency with 27° C. ambient temperature (TA). The resonant clocking system 100 uses lower power than conventional clock distribution networks and thus produces lower heat than existing clock networks. For example, a 48-pin Ceramic Leadless Chip Carrier (CLCC) package has a thermal resistance (①J A) of 40° C./W [33]. Considering a power difference of 0.181 W would result in a 7.2° C. higher temperature than the resonant clocking system 100 for ISPD 2010 01. in a circuit at 5 GHz frequency. For a typical SOC implementation with 10 sinks as ISPD 2010 01. in a circuit, a power difference of 1.81 W would result in a 72.4° C. higher temperature than the resonant clocking system 100. In a clock network, the variations in branch capacitances require different inductance values.

Figure 8:
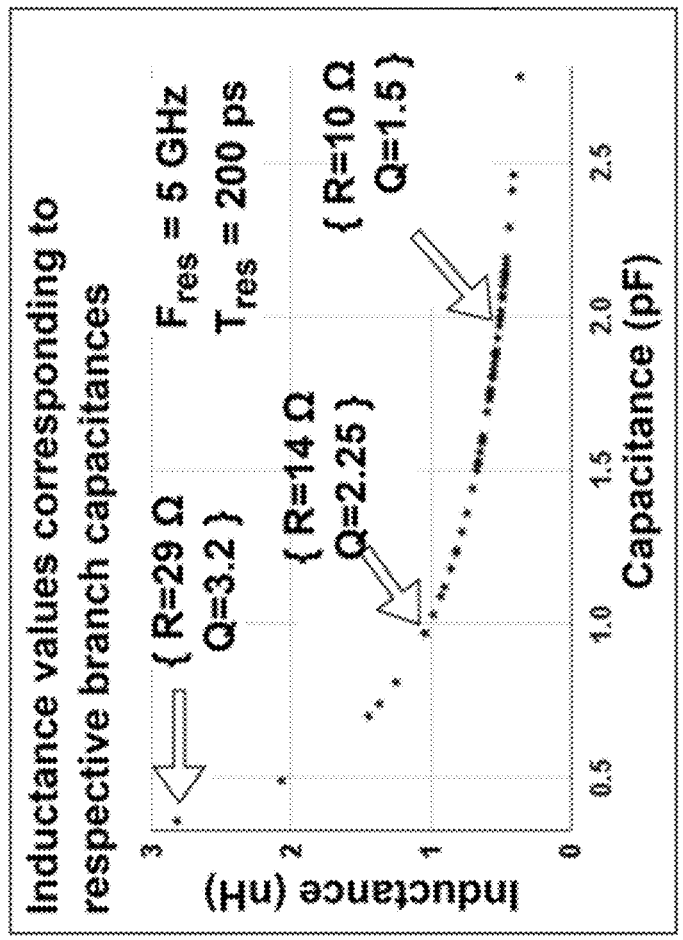
FIG. 8 is an exemplary diagram that illustrates inductance and capacitance values extracted from benchmark circuits according to some embodiments herein.

FIG. 8 is an exemplary diagram 800 that illustrates inductance and capacitance values extracted from benchmark circuits according to some embodiments herein. In some embodiments, resistance values are the sum of the resistance of the inductor, wiring resistance, and n-transistor "ON" resistance. In some embodiments, the quality factor (Q) of the inductor is directly proportional to the inductance value and inversely proportional to capacitance and resistance values. Thus, larger capacitances result in a low-quality factor, whereas higher inductance values result in large resistance values leading to a low-quality factor. Hence, while designing the inductors, a range of quality factors is provided that would result in higher power savings. A range of Q between $\pi$ and $\pi/3$ would result in higher power savings. In some embodiments, the top two metal layers are used for implementing the inductors, which do not

| Benchmark | Methodology | Technology node | Frequency | Power (mW) | Skew (ps) |
|---|---|---|---|---|---|
| ISPD 2009 s1r1 | ROCKS | 45 nm | 1 GHz | 71.1 | 20 |
| | LARCS | 45 nm | 1 GHz | — | — |
| | HCDN | 45 nm | 1 GHz | 20.2 | 21 |
| | PRFF network | 14 nm | 1 GHz | 2.15 | 4.4 |
| ISPD 2010 01. in | ROCKS | 45 nm | 1 GHz | 179.3 | 77 |
| | LARCS | 45 nm | 1 GHz | 368 | 32 |
| | HCDN | 45 nm | 1 GHz | 38.2 | 11 |
| | PRFF network | 14 nm | 1 GHz | 18.4 | 4.25 |

Table 6 compares results with the implementation of distributed LC resonant clock grid synthesis (ROCKS), library-aware resonant clock synthesis (LARCS), and hybrid-mode clock distribution networks (HCDN). The HCDN clocking scheme may use global bufferless current-mode (CM) clocking and locally buffered voltage-mode (VM) clocking.

Figures 9A, 9B:
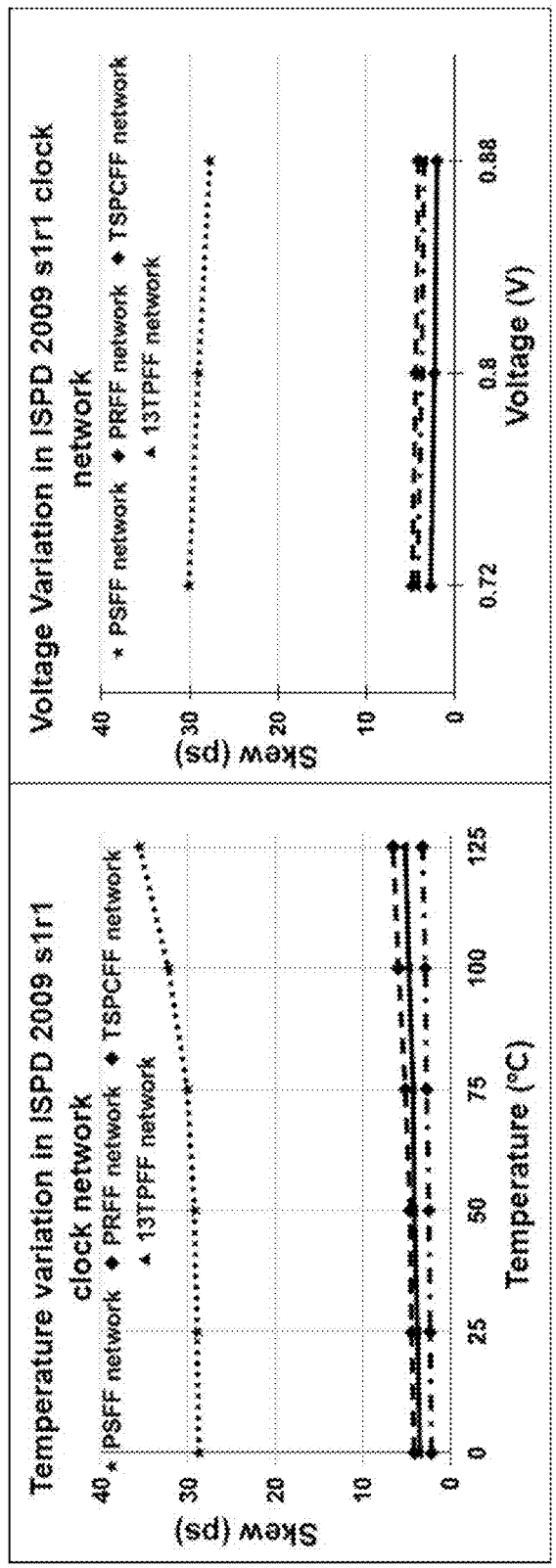
FIGS. 9A-9B are exemplary graphs that illustrate the effect of temperature and voltage variation on clock skew using an ISPD 2009 testbench circuit according to some embodiments herein.

FIGS. 9A-9B are exemplary graphs that illustrate the effect of temperature and voltage variation on clock skew using an ISPD 2009 testbench circuit according to some embodiments herein. FIG. 9A depicts a clock skew comparison at 1 GHz frequency with varying temperatures from 0° C. to 125° C. In some embodiments, the conventional clock network may use a PSFF that includes a skew varying between 28.8 and 35.6 ps while the resonant clocking system 100 with PRFF has a skew variation between 4.1 and 6.5 ps. In some embodiments, the lesser impact on the resonant clocking system 100 is due to a reduced number of buffers compared to the conventional networks. Moreover, the resonant clocking system 100 with TSPCFF has a skew variation between 2.1 and 3.15 ps, and 13TPFF has a skew variation between 3.45 and 5.1 ps. FIG. 9B depicts a clock skew comparison at 1 GHz. 10% variation in the supply voltage (VDD) from nominal VDD is considered. The Conventional clock architecture with PSFF has a skew variation of 27.2-30.1 ps, while the resonant clocking system 100 with TSPCFF has a skew variation of 1.99-2.7 ps. Moreover, the resonant clocking system 100 has a skew variation of 4.1-4.8 ps while using the PRFF and has a skew variation of 3.46-4.2 ps while using the 13TPFF.

Figure 10:
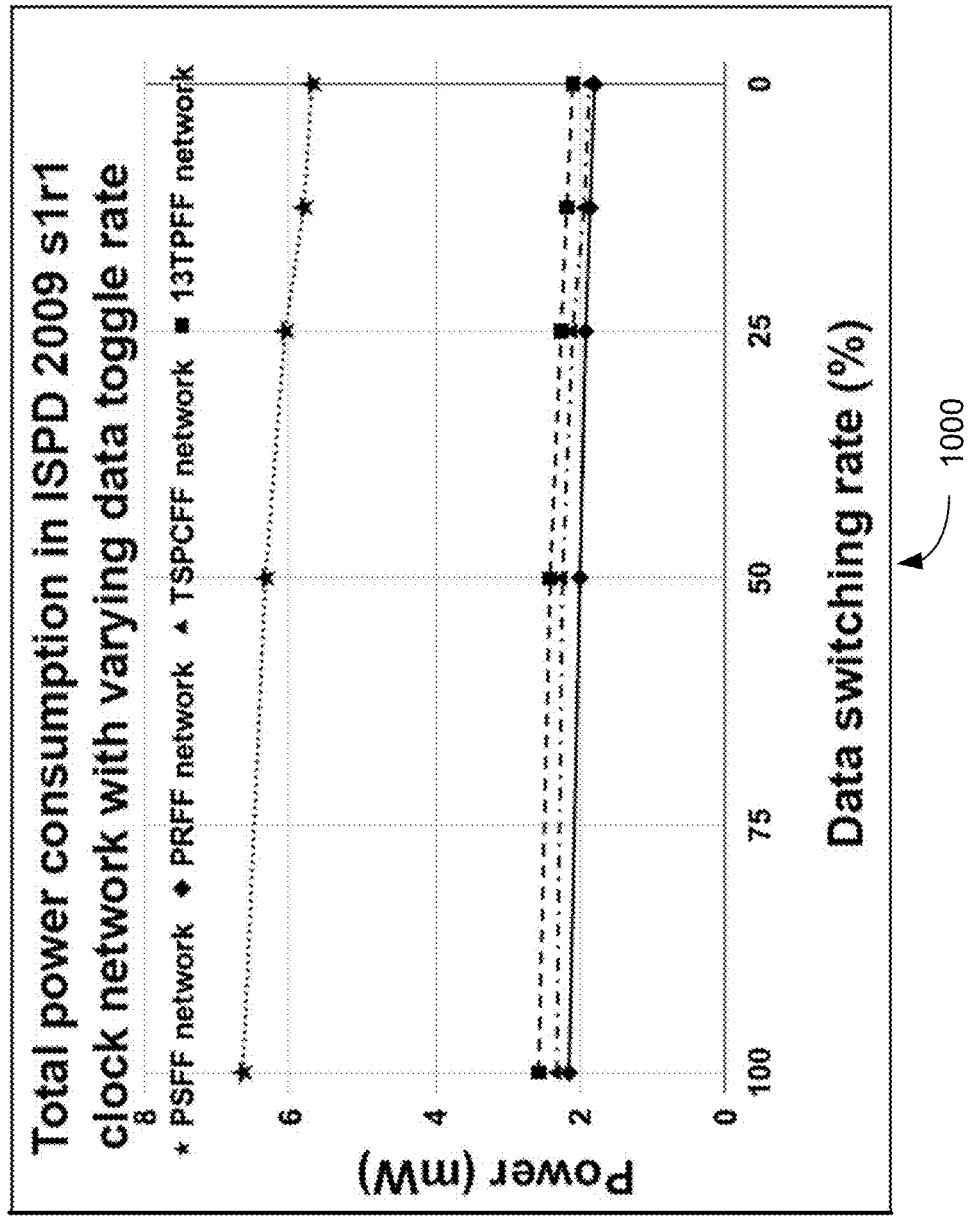
FIG. 10 is an exemplary diagram that illustrates total power consumption in ISPD 2009 s1r1 clock with varying data toggle rates shows higher power savings with high toggle rate according to some embodiments herein.

FIG. 10 is an exemplary diagram 1000 that illustrates total power consumption in ISPD 2009 s1r1 clock with varying data toggle rates shows higher power savings with a high toggle rate according to some embodiments herein. In FIG. 10, the total power consumed in the ISPD 2009 testbench circuit (s1r1 with 81 sinks) is compared with varying data switching rates. the resonant clocking system 100 has higher power savings with a high data switching rate, as the flip-flops toggle the data with every clock cycle. The PRFF network saves 66% with a 100% data switching rate, while it saves 64% with a 0% data switching rate.

Figure 11:
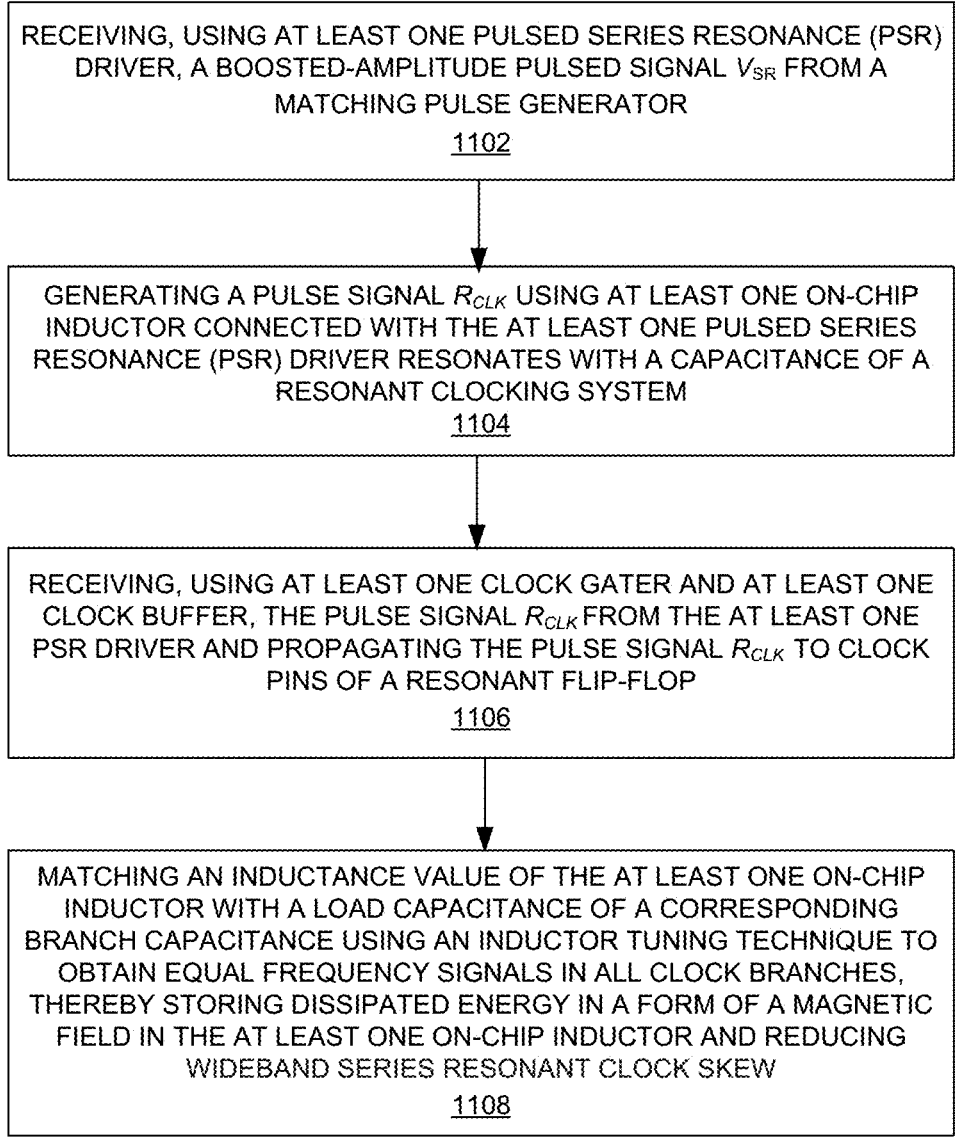
FIG. 11 is a flow diagram that illustrates a method for reducing wideband series resonant clock skew according to some embodiments herein

FIG. 11 is a flow diagram that illustrates a method for reducing wideband series resonant clock skew according to some embodiments herein. At step 1102, the method includes, receiving, using at least one Pulsed Series Resonance (PSR) driver, a boosted-amplitude pulsed signal $V_{SR}$ from a matching pulse generator. At step 1104, the method includes, generating a pulse signal $R_{CLK}$ using at least one on-chip inductor connected with the at least one Pulsed Series Resonance (PSR) driver resonates with a capacitance of a resonant clocking system. At step 1106, the method includes, receiving, using at least one clock gater and at least one clock buffer, the pulse signal $R_{CLK}$ from the at least one PSR driver and propagating the pulse signal $R_{CLK}$ to clock pins of a resonant flip-flop. At step 1108, the method includes matching an inductance value of the at least one on-chip inductor with a load capacitance of a corresponding branch capacitance using an inductor tuning technique to obtain equal frequency signals in all clock branches, thereby storing dissipated energy in a form of a magnetic field in the at least one on-chip inductor and reducing wideband series resonant clock skew.

In some embodiments, the one or more PSR drivers 106A-N and the size of the one or more on-chip inductors ($L_{SR1}$, $L_{SR7}$, to $L_{SR8}$) for a resonant tree are determined using algorithm 1 in the following method. Algorithm 1 obtains a clock network ($clk_{tree}$), list of branch capacitances ($C_{br}$), system clock frequency ($F_{clk}$), duty cycle for resonance ($DC_{rez}$), and a maximum skew constraint ($S_{max}$) along with a predetermined range of inductor quality factor ($Q_{range}$). The output of the algorithm 1 is a resonant clock tree, i.e., the resonant clocking system 100. The method includes transforming a conventional clock network by replacing standard drivers with the one or more PSR drivers 106A-N using a "Replace Drivers( )" function. The method includes determining the sizes of the one or more on-chip inductors ($L_{SR1}$, $L_{SR7}$, to $L_{SR8}$) for each PSR driver using an "Ind Sizing( )" function. This calculation ensures appropriate inductor values aligned with the capacitance of each branch. Following this, transient simulations are conducted using Synopsys PrimeSim HSPICE to extract key parameters such as rise times, fall times, and initial skew. The method includes verifying an output swing of the replaced PSR drivers within a calculated period ($T_d$) from a second rising edge to a falling edge of the clock signal. The method includes adjusting driver strength using the "Resize Driver( )" function as necessary to meet swing requirements. If the output swing fails to meet $V_{DD}$ to $V_{OL}$ requirements, branch partitioning is performed, and new PSR drivers are placed accordingly. The method includes performing transient simulations to determine the latency of each branch and sorting latency values in a descending order using a "Sort( )" function to derive the initial skew of the resonant clocking system 100. If the skew exceeds a maximum skew constraint ($S_{max}$), branch partitioning is initiated for a branch with the highest latency. Therefore, New PSR drivers are placed, and appropriate inductor sizing is determined. This iterative process continues until the obtained skew falls within the maximum skew constraint or until no significant improvement in skew is observed after an iteration.

Algorithm 1. Determining the Resonant Drivers and Inductor Size for Resonant Tree Input: Input network ($clk_{tree}$), Branch capacitances ($C_{br}$), System clock frequency ($F_{clk}$),
Duty cycle for resonance ($DC_{rez}$), Skew constraint ($S_{max}$), Q-factor range ($Q_{range}$);
Output: Resonant clock tree;
$N_{Dr}$ = ReplaceDrivers($clk_{tree}$);
$L_{Dr}$ = IndSizing($C_{br}$, $DC_{rez}$, $N_{Dr}$, $Q_{range}$);
TransientSimulation( )
while swing at all nodes ≤ 90%(VDD) do
    $driver_{SizeNew}$ = ResizeDriver(driver size);
    if swing at all nodes ≤ 90%(VDD) then
        $N_{DrNew}$ = PartitionBranch(localBranch);
        PlaceDriver(NDrNew);
        IndSizing($C_{br}$, $DC_{rez}$, $N_{DrNew}$, $Q_{range}$);
    end if
end while
TransientSimulation( )
$Branch_{List}$ = Sort($N_{Dr}$, latency)
while skew > $S_{max}$ do
    $N_{DrNew}$ = PartitionBranch(localBranch)
    PlaceDriver($N_{DrNew}$);
    IndSizing($C_{br}$, $DC_{rez}$, $N_{DrNew}$, $Q_{range}$)
end while In some embodiments, the one or more PSR drivers 106A-N and the size of the one or more on-chip inductors ($L_{SR1}$, $L_{SR7}$, to $L_{SR8}$) for a resonant mesh using the following method. The method includes initializing an algorithm with a uniform clock mesh of (d×d) dimension, mesh capacitance ($C_m$), and load capacitances ($C_l$). Parameters such as system clock frequency ($F_{clk}$), the duty cycle for resonance ($DC_{rez}$), maximum skew constraint ($S_{max}$), and a predetermined range of inductor quality factors ($Q_{range}$) are also considered. The method includes dividing the mesh into smaller grids of size (m×n) based on an initial driver strength. Each partitioned grid is then equipped with a PSR driver placed at its center. The method includes calculating an inductance for each PSR driver using an "Ind Sizing( )" function. The method includes executing transient simulations to ensure that all nodes of the clock mesh exhibit a $V_{DD}$ to $V_{OL}$ swing within a specified period ($T_d$). If swing requirements are not met, the one or more PSR drivers 106A-N are resized using a "Resize Driver( )" function, or the grid is divided into two equal parts. New PSR drivers are placed, and new inductor values are determined iteratively until swing criteria are fulfilled. In some embodiments, another transient simulation is conducted to determine the latency of each branch to further refine the clock mesh. In some embodiments, the latencies obtained are then sorted in descending order to obtain the initial skew of the clock mesh network. If the skew exceeds the maximum constraint ($S_{max}$), the local grid is divided, and the one or more PSR drivers 106A-N are placed accordingly. This process continues until the generated skew is within the specified limit or if no improvement in skew is observed.

Algorithm II. Determining the Resonant Drivers and Inductor Size for Resonant Mesh Input: Uniform mesh dimensions (d x d), Mesh capacitance ($C_m$), Load capacitances ($C_l$),
System clock frequency ($F_{clk}$), the Duty cycle for resonance ($DC_{rez}$), Skew constraint ($S_{max}$), Q-factor range ($Q_{range}$);
Output: Resonant grid;
$N_{Dr}$ = PartitionMesh(DM);
PlaceDriver($N_{Dr}$);
$L_{Dr}$ = IndSizing($C_m$, $C_l$, $DC_{rez}$, $N_{Dr}$, $Q_{range}$);
TransientSimulation( )
while swing at all nodes ≤ 90%(VDD) do
   driver$_{sizeNew}$ = ResizeDriver(driver size);
   if swing at all nodes ≤ 90%(VDD) then
     $N_{DrNew}$ = PartitionMesh(localMesh);
     PlaceDriver($N_{DrNew}$);
     IndSizing($C_{mLocal}$, $C_{lLocal}$, $DC_{rez}$, $N_{DrNew}$, $Q_{range}$);
   end if
end while
TransientSimulation( )
Branch$_{List}$ = Sort($N_{Dr}$, latency)
while skew > $S_{max}$ do
   $N_{DrNew}$ = PartitionMesh(localMesh)
   PlaceDriver($N_{DrNew}$);
   IndSizing($C_{mLocal}$, $C_{lLocal}$, $DC_{rez}$, $N_{DrNew}$, $Q_{range}$)
end while Energy recycling resonant pulsed flip-flops enable the reuse of dissipated energy through series inductor-capacitor (LC) resonance, thereby increasing energy efficiency and sustainability. Additionally, the unveiling of wideband clocking architectures utilizing series LC resonance and inductor tuning techniques enhances the efficiency and reliability of clock networks. Through the utilization of pulsed resonance, the recycling of switching power is achieved, leading to substantial energy savings. Moreover, the incorporation of inductor tuning techniques contributes to skew reduction, thereby enhancing the overall performance and reliability of clock networks. The resonant clocking system includes enhanced energy efficiency, reduced power consumption, improved performance, and innovative solutions to longstanding challenges in clock network design.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A resonant clocking system for reducing wideband series resonant clock skew, comprising:
at least one Pulsed Series Resonance (PSR) driver that receives a boosted-amplitude pulsed signal $V_{SR}$ from a matching pulse generator;
at least one on-chip inductor connected with the at least one Pulsed Series Resonance (PSR) driver resonates with a capacitance of the resonant clocking system to generate a pulse signal $R_{CLK}$;
at least one clock gater and at least one clock buffer that receive the pulse signal $R_{CLK}$ from the at least one PSR driver and propagate the pulse signal $R_{CLK}$ to clock pins of a resonant pulsed flip-flop,
wherein an inductance value of the at least one on-chip inductor is matched with a load capacitance of a corresponding branch capacitance using an inductor tuning technique to obtain equal frequency signals in all clock branches, thereby storing dissipated energy in a form of a magnetic field in the at least one on-chip inductor and reducing wideband series resonant clock skew.

2. The resonant clocking system of claim 1, further comprises a dual-rail booster that is integrated with the matching pulse generator to generate the boosted amplitude signal using a series resonance by matching a shared inductor $L_2$ with a load capacitance $C_2$.

3. The resonant clocking system of claim 1, wherein the resonant pulsed flip-flop comprises a transistor M2 and a transistor M3, wherein input data is inverted and provided to the transistors M2 and M3, and drain of the transistors M2 and M3 are connected to storage cells for storing logic "1" or logic "0".

4. The resonant clocking system of claim 1, wherein the resonant pulsed flip-flop further comprises a transistor M4 and a transistor M5 controlled by a reset signal, wherein when the reset signal is low, the transistor M4 is turned on and the transistor M5 is turned off, resulting in a logic "1" at node SB and writing a logic "0" to an output Q.

5. The resonant clocking system of claim 1, wherein the resonant pulsed flip-flop further comprises a clock signal $P_{clk}$, wherein when the clock signal $P_{clk}$ is "0", a transistor M1 is turned off, maintaining the resonant pulsed flip-flop in a hold or a retained state with unaltered values of nodes S and SB.

6. The resonant clocking system of claim 1, wherein when the input data is "1" and the clock signal $P_{clk}$ is "1", the transistors M2 and M1 are turned on, connecting node SB to ground, discharging the node, and resulting in a logic "1" at node Q, thereby writing a "1" into the at least one pulsed register.

7. The resonant clocking system of claim 1, wherein when the input data is "0" and the clock signal Pclk is "1", the transistors M3 and M1 are turned on, writing a logic "0" at node Q.

8. The resonant clocking system of claim 1, wherein the at least one PSR driver generates a clock pulse using the dissipated energy stored in the at least one on-chip inductor to drive clock input pins of the at least one pulsed register.

9. The resonant clocking system of claim 1, wherein the dissipated energy stored in the at least one on-chip inductor is recycled in a next rising clock edge.

10. The resonant clocking system of claim 1, wherein the pulse signal ($R_{CLK}$) is a rail-to-rail swing signal.

11. The resonant clocking system of claim 1, wherein the output signal ($R_{CLK}$) of the at least one PSR driver is inverted using the at least one clock gater and the at least one clock buffer and employed as the clock input signal ($P_{clk}$) for the at least one pulsed register.

12. The resonant clocking system of claim 1, wherein the wideband series resonant clock skew is reduced at runtime by
dynamically adjusting a resonant pulse width $T_d$ to compensate for capacitance and inductance mismatch induced by at least one of an open circuit voltage (OCV) and process variations; and
finely adjusting equivalent inductance with granularity using a knob, thereby reducing the wideband series resonant clock skew in runtime.

13. A resonant clock mesh system for reducing wideband series resonant clock skew, comprising:
at least one Pulsed Series Resonance (PSR) driver that receives a boosted-amplitude pulsed signal $V_{SR}$ from a matching pulse generator;
at least one on-chip inductor connected with the at least one Pulsed Series Resonance (PSR) driver resonates with a capacitance of the resonant clocking system to generate a pulse signal $R_{CLK}$;
a clock mesh that is connected with the at least one Pulsed Series Resonance (PSR) driver;
at least one clock gater and at least one clock buffer that receive the pulse signal $R_{CLK}$ from the at least one PSR driver through the clock mesh and propagate the pulse signal $R_{CLK}$ to clock pins of a resonant pulsed flip-flop, wherein an inductance value of the at least one on-chip inductor is matched with a load capacitance of the clock mesh, thereby storing dissipated energy in a form of a magnetic field in the at least one on-chip inductor and reducing wideband series resonant clock skew.

14. The resonant clock mesh system of claim 13, wherein the load capacitance is determined by accumulating a local mesh capacitance ($C_{mLocal}$) and corresponding branch capacitances ($C_{lLocal}$).

15. The resonant clock mesh system of claim 13, wherein the resonant pulsed flip-flop comprises a transistor M2 and a transistor M3, wherein input data is inverted and provided to the transistors M2 and M3, and drain of the transistors M2 and M3 are connected to storage cells for storing logic "1" or logic "0".

16. The resonant clock mesh system of claim 13, wherein the resonant pulsed flip-flop further comprises a transistor M4 and a transistor M5 that are controlled by a reset signal, wherein when the reset signal is low, the transistor M4 is turned on and the transistor M5 is turned off, resulting in a logic "1" at node SB and writing a logic "0" to an output Q.

17. The resonant clock mesh system of claim 13, wherein the resonant pulsed flip-flop further comprises a clock signal $P_{clk}$, wherein when the clock signal $P_{clk}$ is "0", a transistor M1 is turned off, maintaining the resonant pulsed flip-flop in a hold or a retained state with unaltered values of nodes S and SB.

18. The resonant clock mesh system of claim 13, wherein when the input data is "1" and the clock signal $P_{clk}$ is "1", the transistors M2 and M1 are turned on, connecting node SB to ground, discharging the node, and resulting in a logic "1" at node Q, thereby writing a "1" into the at least one pulsed register.

19. The resonant clock mesh system of claim 13, wherein when the input data is "0" and the clock signal Pclk is "1", the transistors M3 and M1 are turned on, writing a logic "0" at node Q.

20. A method for reducing wideband series resonant clock skew, comprising:
receiving, using at least one Pulsed Series Resonance (PSR) driver, a boosted-amplitude pulsed signal $V_{SR}$ from a matching pulse generator;
generating a pulse signal $R_{CLK}$ using at least one on-chip inductor connected with the at least one Pulsed Series Resonance (PSR) driver resonates with a capacitance of a resonant clocking system;
receiving, using at least one clock gater and at least one clock buffer, the pulse signal $R_{CLK}$ from the at least one PSR driver and propagate the pulse signal $R_{CLK}$ to clock pins of a resonant flip-flop; and
matching an inductance value of the at least one on-chip inductor with a load capacitance of a corresponding branch capacitance using an inductor tuning technique to obtain equal frequency signals in all clock branches, thereby storing dissipated energy in a form of a magnetic field in the at least one on-chip inductor and reducing wideband series resonant clock skew.

\* \* \* \* \*